(12) United States Patent
Bader

(10) Patent No.: US 6,824,864 B2
(45) Date of Patent: Nov. 30, 2004

(54) MULTI-LAYER, WHITE CAVITATED BIORIENTED POLYETHYLENE FILM WITH A HIGH WATER VAPOR TRANSMISSION RATE

(75) Inventor: Michael John Bader, Fairport, NY (US)

(73) Assignee: ExxonMobil Oil Corporation, Irving, TX (US)

( * ) Notice: Subject to any disclaimer, the term of this patent is extended or adjusted under 35 U.S.C. 154(b) by 94 days.

(21) Appl. No.: 10/001,379

(22) Filed: Oct. 23, 2001

(65) Prior Publication Data

US 2003/0082392 A1 May 1, 2003

(51) Int. Cl.$^7$ .................. B32B 3/26; B32B 27/06; B29C 47/06
(52) U.S. Cl. .................. 428/304.4; 428/317.9; 428/318.6; 428/318.8; 428/319.9; 428/515; 428/516; 428/910; 264/173.12; 264/173.14; 264/173.15; 264/173.16; 264/173.19
(58) Field of Search .................. 428/317.9, 318.6, 428/318.8, 319.9, 516, 304.4, 515, 910; 264/173.16, 173.14, 173.19, 173.12, 173.15

(56) References Cited

U.S. PATENT DOCUMENTS

| | | | |
|---|---|---|---|
| 4,377,616 A | 3/1983 | Ashcraft et al. | 428/213 |
| 4,632,869 A | 12/1986 | Park et al. | 428/315.5 |
| 5,529,843 A | 6/1996 | Dries et al. | 428/336 |
| 5,667,902 A | 9/1997 | Brew et al. | 428/518 |
| 5,683,802 A * | 11/1997 | Murschall et al. | 428/325 |
| 5,885,721 A | 3/1999 | Su et al. | 428/516 |
| 5,891,555 A | 4/1999 | O'Brien | 428/213 |
| 6,106,956 A | 8/2000 | Heyn et al. | 428/516 |
| 6,228,505 B1 | 5/2001 | Agent et al. | 428/516 |
| 6,410,132 B1 * | 6/2002 | Peiffer et al. | 428/336 |
| 6,458,469 B1 * | 10/2002 | DeLisio et al. | 428/516 |
| 6,534,166 B1 * | 3/2003 | Pip et al. | 428/316.6 |
| 6,540,949 B2 * | 4/2003 | Pip et al. | 264/172.19 |
| 6,562,478 B1 * | 5/2003 | Fischer et al. | 428/516 |
| 2001/0017431 A1 | 8/2001 | Pip et al. | 264/172.19 |

FOREIGN PATENT DOCUMENTS

JP 6340040 12/1994
WO WO 00/12302 3/2000

* cited by examiner

Primary Examiner—Monique R. Jackson
(74) Attorney, Agent, or Firm—Rick F. James

(57) ABSTRACT

The present invention relates to bioriented polyethylene films having high water vapor transmission rates (WVTR) and methods for preparing the same. The film comprises a base layer and skin layers. The base layer comprises highly cavitated polyethylene, such as medium density polyethylene (MDPE) or high density polyethylene (HDPE). The cavitating agent in the base layer may be calcium carbonate. At least one skin layer comprises (i) a copolymer of ethylene and at least one other monomer and (ii) a hydrocarbon resin, such as a cyclopentadiene resin. This copolymer (i) may be an ethylene-propylene copolymer or an ethylene-propylene-butene-1 terpolymer. The film may have unidirectional tear properties in the machine direction. This film is particularly useful for packaging food products, such as pieces of candy.

20 Claims, No Drawings

MULTI-LAYER, WHITE CAVITATED BIORIENTED POLYETHYLENE FILM WITH A HIGH WATER VAPOR TRANSMISSION RATE

BACKGROUND

The present invention relates to polymer films and methods for preparing polymer films. Specifically, the present invention relates to bioriented polyethylene films having high water vapor transmission rates (WVTR) and methods for preparing the same.

Generally, in the preparation of a film from granular or pelleted polymer resin, the polymer is first extruded to provide a stream of polymer melt, and then the extruded polymer is subjected to the film-making process. Film-making typically involves a number of discrete procedural stages, including melt film formation, quenching, and windup. For a general description of these and other processes associated with film-making, see K R Osborn and W A Jenkins, Plastic Films: Technology and Packaging Applications Technomic Publishing Co., Inc., Lancaster, Pa. (1992).

An optional part of the film-making process is a procedure known as "orientation." The "orientation" of a polymer is a reference to its molecular organization, i.e. the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties).

Orientation is accomplished by heating a polymer to a temperature at or above its glass-transition temperature (Tg) but below its crystalline melting point (Tm), and then stretching the film quickly. On cooling, the molecular alignment imposed by the stretching competes favorably with crystallization, and the drawn polymer molecules condense into a crystalline network with crystalline domains (crystallites) aligned in the direction of the drawing force. As a general rule, the degree of orientation is proportional to the amount of stretch, and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e. measurably higher stiffness and strength. Further, as a general rule, higher orientation correlates with lower WVTR values for films.

Previously, high WVTR values have been difficult to achieve with polyolefin films. Typically, film production methods aim to lower WVTR values for polyolefin films. As such, polyolefin films inherently have low WVTR values compared to traditional wrapping materials such as cellulose films or paper.

Accordingly, it is one of the purposes of this invention, among others, to produce bioriented polyethylene films having high WVTR values, by providing an economical and relatively uncomplicated method of making polyethylene films that imparts superior characteristics to the films, without requirement for chemically reactive additives, such as cross-linking agents, and without requirement for supplemental processing steps, such as irradiation of the film.

SUMMARY

A multi-layer, bioriented film is stretched in the machine direction and in the transverse direction. This film may have high WVTR and comprises (a) a base layer comprising polyethylene and a cavitating agent, said base layer having a first and second side; and (b) skin layers on said first and second sides of said base layer, wherein at least one of said skin layers comprises (i) a hydrocarbon resin and (ii) a copolymer of ethylene and at least one monomer having at least three carbon atoms.

This film may be prepared by a method comprising the steps of:

(i) coextruding layers having the composition of said layers (a) and (b);

(ii) casting said coextruded layers of step (i) over a casting roll;

(iii) stretching said cast film of step (ii) in the machine direction; and (iv) further stretching said stretched film of step (iii) in the transverse direction, wherein said skin layer (b) is on the casting roll side of the film.

A package comprising this film may have a flattened tube shape. This flattened tube may be thought of as having a structure corresponding to that formed by bending the present film into a cylinder and adhering the contacted edges of the film to one another. The open ends of the cylinder or tube are then pressed together to flatten the tube.

The above-mentioned package may comprise a film with unidirectional tear properties in the machine direction. This package may have a lengthwise seal running in a direction perpendicular to two end seals. The machine direction of the film is parallel to the end seals and perpendicular to the lengthwise seal. The sealed package may contain multiple pieces of a food product, such as candy. This package is adapted for easy opening when held in a substantially vertical fashion, where one end seal is held above the level of the food product. The package is adapted to tear in a straight line along the machine direction at a level above the food pieces and at a level below the top seal to provide an opening above the level of the food pieces, such that these pieces do not fall out or spill when the package is opened.

DETAILED DESCRIPTION

This invention provides a new method for adhering a skin layer to a cavitated HDPE core layer in a biaxially oriented film. It also provides a method for increasing the permeability of an oriented skin layer on a HDPE core layer. The addition of a low molecular weight thermoplastic hydrocarbon to a terpolymer or copolymer skin on a cavitated HDPE core, resulted in a high WVTR structure, good adhesion of the core to the skin layer, and an improvement in oriented HDPE film manufacturing. The WVTR of the present multi-layer film may be at least 3.0 grams/100 square inches/day at 100° F. (38° C.) and 100% relative humidity (RH). WVTR may be measured according to ASTM method F124-90.

A 3-layer design has been proven to work well at low orienter speeds. A 4-layer film design was also investigated in the event that skin adhesion becomes an issue at high orienter speeds with the 3-layer design.

The present invention provides a biaxially oriented HDPE film for applications that require high WVTR, good stiffness and good deadfold properties. The structure of an HDPE film disclosed in U.S. patent application Publication Ser. No. US 2001/0017431 was modified to improve the manufacture of the film, while not changing the desired properties of the film. In particular, the cast roll side skin layer was changed from a polyethylene skin layer to a copolymer, especially a terpolymer, skin layer, which further included a hydrocarbon resin, especially a cyclopentadiene resin. As a result of this modification, benefits were realized including improved manufacturing via a tenter frame process, improved skin adhesion of the skin layer to the core layer and high WVTR properties. It was most surprising that the addition of the hydrocarbon to the terpolymer or copolymer skin made the skin more permeable to moisture compared to a terpolymer without hydrocarbon. By way of contrast, in the Brew et al U.S. Pat. No. 5,667,902, it is reported that the WVTR decreases, when hydrocarbon resin is added to a base layer comprising a blend of high crystallinity polypropylene (HCPP) and conventional isotactic polypropylene (PP).

Films disclosed in U.S. patent application Publication Ser. No. US 2001/0017431 include a 3-layer symmetrically designed white biaxially oriented high density (BiHD) film. This film had high WVTR, e.g., greater than 4 gms./100 sq. in./day. The skin layers were polyethylene (PE), i.e. medium density polyethylene or low density polyethylene (MDPE or LDPE), and the core layer was a cavitated high density polyethylene (HDPE). The PE skin layers were permeable to moisture, and the HDPE cavitated core (with calcium carbonate) was a more open cell structure than a cavitated oriented polypropylene (OPP) film. As a result, this HDPE film had a very high WVTR (greater than 4 gms./100 sq. in./day).

Based on manufacturing trials on a "standard" tenter frame process, this film can be difficult to produce because the PE skin layer does not "wet out" uniformly on a cast roll. As a result, the basesheet tends to curl especially at the edges. One method of reducing the curl is to change the cast roll side skin layer to a polypropylene (PP) skin layer. PP tends to wet out uniformly on a cast roll and, therefore, reduces or minimizes the basesheet edge curling.

One of the issues with a polypropylene skin is it will become oriented in the tenter frame process. The orientation improves the water vapor barrier properties of the film resulting in a WVTR of 0.8–2.0 gm./100 sq.in./day.

Another issue with a polypropylene (PP) skin layer on a biaxially oriented HDPE core is adhesion. Polypropylene is not compatible with a PE core especially when it is biaxially oriented. The PP skin will not adher to the PE core and as a result the skin will peel or delaminate in the machine direction orientation (MDO) of the film.

Various structured polyethylene films having high WVTR can be produced by the methods of the present invention. One embodiment of the present invention provides for a film having a base layer and at least one skin layer whereby the polyethylene film has a desired WVTR and the base layer has a porous microstructure. The base layer includes polyethylene and a cavitating agent, and preferably, the polyethylene is a medium density polyethylene (MDPE) or a high density polyethylene (HDPE). The base layer also has a first side and a second side. Further, the base layer preferably has a thickness of from about 0.5 mil to about 2.0 mil (1 mil=0.001 inch=100 gauge). It should be noted that any thickness value provided herein does not account for additional thickness resulting from cavitation.

It will be understood that when a layer is referred to as being "on" another layer, it can be directly on the other layer or one or more intervening layers may also be present. In contrast, when a layer is referred to as being "directly on" another layer, there are no intervening layers present.

At least one skin layer of the multi-layer film is coextensive with one of the sides of the base layer and includes (i) a hydrocarbon resin and (ii) a copolymer of ethylene and at least one monomer having at least three carbon atoms. Further, it is preferable that each skin layer has a thickness of from about 0.03 mil (3 gauge) to about 0.15 mil (15 gauge).

Copolymer (ii) in skin layer (b) may be formed by copolymerizing a mixture of monomers comprising at least 5 wt % ethylene. Such a copolymer may be said to have at least 5 wt % ethylene units. Examples of copolymer (ii) are copolymers of ethylene and propylene and terpolymers of ethylene, propylene and butene-1. A particular example of such an ethylene-propylene copolymer is Fina 9474B and a particular example of such an ethylene-propylene-butene-1 terpolymer is Chisso 7510.

The skin layer (b) comprising copolymer (ii) also comprises one or more hydrocarbon resins. The hydrocarbon resin(s) may be present in the skin layer in a total amount of from 5 wt % to 30 wt %, for example, from 5 wt % to 25 wt %, e.g., from 10 wt % to 20 wt %, based upon the total weight of the skin layer.

The hydrocarbon resin(s) may be a low molecular weight hydrocarbon which is compatible with the film-forming polyolefin of the skin layer. The hydrocarbon resin(s) may, optionally, be hydrogenated. The hydrocarbon resin(s) may have a number average molecular weight of less than 5,000, for example, less than 2,000, e.g. from 500 to 1,000. The resin(s) can be natural or synthetic and may have a softening point in the range of from 60° C. to 180° C. Examples of a hydrocarbon resin that may be contained in the present core layer include any of the hydrocarbon resins disclosed in U.S. Pat. No. 5,667,902 to Brew, et al and in U.S. Pat. No. 5,529,843 to Dries, et al. Specific examples include, but are not limited to, petroleum resins, terpene resins, styrene resins, and cyclopentadiene resins. Examples of commercially available hydrogenated resins include PICCOLYTE, REGALREZ, and REGALITE, each of which are available from Hercules Corp., and ESCOREZ, available from ExxonMobil Chemical Co. Particularly preferred resins are Exxon 6114E1 and Exxon 6114E2.

Petroleum resins include hydrocarbon resins which are produced by polymerization of highly decomposed crude oil materials in the presence of a catalyst. These decomposed crude oil materials usually comprise a mixture of resin-forming substances such as styrene, methylstyrene, vinyltoluene, indene, methylindene, butadiene, isoprene, piperylene and pentylene. The styrene resins can be low-molecular homopolymers of styrene or copolymers of styrene with other monomers such as methylstyrene, vinyltoluene and butadiene. Cyclopentadiene resins include cyclopentadiene homopolymers or cyclopentadiene copolymers which are obtained from coal tar distillates and separated crude oil gas. These resins are produced by holding the materials, which comprise cyclopentadiene, at an elevated temperature for a prolonged period of time. Dimers, trimers or oligomers can be obtained depending on the reaction temperature. Those skilled in the art are familiar with the techniques employed in fabricating these cyclopentadiene resins.

The terpene resins include polymers of terpenes, i.e. hydrocarbons of the formula $C_{10}H_{16}$, which are present in almost all essential oils or oil-comprising resins from plants as well as phenol-modified terpene resins. Specific examples of terpenes which are useful in the invention are pinene, alpha-pinene, dipentene, limonene, myrcene, camphene and similar terpenes.

The hydrocarbon resins also can be modified hydrocarbon resins. The modification may be effected in general by reacting the raw materials before the polymerization, by introducing special monomers or by reacting the polymerized product. Preferably hydrogenations or partial hydrogenations are carried out to modify the hydrocarbon resins.

Hydrocarbon resin polymers and copolymers, such as styrene homopolymers, styrene copolymers, cyclopentadiene homopolymers, cyclopentadiene copolymers and/or terpene polymers, may be used alone or in admixture.

A particular type of hydrocarbon resin that may be included in the skin layer is a saturated alicyclic resin. Saturated alicyclic resins may have a softening point in the range of from 85° C. to 140° C., for example from 100° C. to 140° C., as measured by the ring and ball technique. An example of a commercially available saturated alicyclic resin is ARKON-P, available from Arakawa Forest Chemical Industries, Ltd. of Japan.

Saturated alicyclic hydrocarbon resins may be obtained by hydrogenation of aromatic hydrocarbon resins. The aromatic resins are obtained by polymerizing reactive unsaturated hydrocarbons containing aromatic hydrocarbons in which reactive double bonds are generally in side-chains. The saturated alicyclic resins are obtained from the aromatic resins by hydrogenating the latter until all, or most all, of the unsaturation has disappeared, including the double bonds in the aromatic rings. Although the aromatic hydrocarbons useful in the preparation of the alicyclic resins are mainly compounds containing reactive double bonds in side-chains, they may also comprise hydrocarbons having reactive double bonds in condensed ring systems. Examples of such useful aromatic hydrocarbons include vinyltoluene, vinylxylene, propenylbenzene, styrene, methylstyrene, indene, methylindene and ethylindene. Mixtures of these hydrocarbons may be used.

An embodiment of the present invention provides for a film having the desired WVTR and having a tie layer interposed between a base layer and a skin layer wherein the tie layer is coextensive with each of the base layer and the skin layer. The base layer, which includes polyethylene and a cavitating agent, has a first side and a second side. Further, the base layer has a porous microstructure and a WVTR substantially higher than the overall WVTR for the multi-layer film. A skin layer without the above-mentioned hydrocarbon resin (i) may include MDPE or HDPE. Alternatively, this skin layer may include either an ethylene-propylene copolymer or an ethylene-propylene-butylene terpolymer. A tie layer may include MDPE or a blend of HDPE and low density polyethylene (LDPE).

Another preferred embodiment of the present invention provides for a film wherein a first tie layer is interposed between a base layer and a first skin layer and a second tie layer is interposed between the base layer and a second skin layer. The first tie layer is coextensive with each of the base layer and first skin layer and the second tie layer is coextensive with each of the base layer and the second skin layer.

It should be noted that multi-layer films according to the present invention are not limited to the foregoing structures and can include several layers, such as a plurality of intermediate layers or tie layers, provided to obtain a film having the desired WVTR.

The methods of the present invention provide for adherently superimposing at least one skin layer coextensively to a first side of a base layer having first and second sides and then biaxially orienting the composite polyethylene sheet to obtain a film having a desired WVTR. The base layer of the composite polyethylene sheet includes polyethylene and a cavitating agent. The composite polyethylene sheet is biaxially oriented whereby there is provided a bioriented polyethylene film having the desired WVTR and whereby the base layer has a porous microstructure and a WVTR substantially higher than the overall WVTR of the multi-layer film.

Preferably, the polyethylene of the base layer is a MDPE or a HDPE. Further, it is preferable that the amount of polyethylene provided in the base layer prior to producing a film be an amount sufficient to yield a base layer in the film having a thickness of from about 0.5 mil to about 2.0 mil, especially about 1.0 mil to about 1.4 mil. It should be noted that any thickness value provided herein does not account for additional thickness resulting from cavitation.

The present cavitated HDPE or MDPE layers may have a void content (also referred to herein as porosity) of at least 20%, e.g., 20–85%, preferably at least 50%. Porosity is measured by dividing $(T_1-T_2)$ by $T_1$ and multiplying this fraction by 100, wherein $T_1$ is the thickness of the cavitated layer and $T_2$ is the thickness of the layer in the absence of cavitation. $T_2$ may be calculated on the basis of the density of the HDPE or MDPE.

The overall thickness of the multi-layer film may be from about 0.5 mil to about 2.2 mil, for example, from about 1 mil to about 1.5 mil. It is again noted that these thickness values do not account for additional thickness resulting from cavitation.

A resin-free skin layer may be made from MDPE or a HDPE, however, this skin layer polyethylene may have a density less than that of the polyethylene in the base layer. The skin layer polyethylene may be provided in an amount sufficient to yield a skin layer in the film having a thickness of from about 0.03 mil to about 0.15 ml.

An example of a multi-layer film is one having a three layer structure. For example, a first layer of a resin-free polyethylene is adherently superimposed to a first side of a base layer and a second layer comprising (i) a hydrocarbon resin and (ii) a copolymer of ethylene and at least one monomer having at least three carbon atoms is adherently superimposed to the second side of the base layer. The composite multi-layer sheet is then biaxially oriented.

Another example of a multi-layer film has a five layer structure. In particular, a base layer having first and second sides is provided and is interposed between two tie layers wherein the first tie layer is interposed between the first side of the base layer and a first skin layer, and wherein the second tie layer is interposed between the second side of the base layer and a second skin layer. The tie layers are each adherently superimposed to the base layer and are each coextensive with the base layer. The skin layers are each adherently superimposed to the tie layers and are each coextensive with their adjacent tie layer. The composite multi-layer sheet is then biaxially oriented. The tie layers of this structure may include MDPE or HDPE and may also include a cavitating agent to regulate the WVTR. The skin and tie layers of this structure may each have a thickness of from about 0.03 mil to about 0.15 mil.

Another example of a multi-layer film has a four layer structure. This four layer structure corresponds to the above-mentioned five layer structure except that one of the tie layers is omitted in the four layer structure.

The present invention provides methods for producing polyethylene films having high WVTR values, opacity, high stiffness and resistance to humidity. The films also have excellent deadfold characteristics which make them well suited for packaging of foods in an over-wrap package. These properties make these films an excellent alternative to paper or cellophane in applications where high WVTR and insensitivity of film to moisture are required.

As the term "high density polyethylene" (HDPE) is used herein, it is defined to mean an ethylene-containing polymer having a density of 0.940 or higher. (Density (d) is expressed as $g/cm^3$.) Examples of HDPE include M6211 and L5045 sold by Equistar, HD 7845 sold by ExxonMobil, and GD 7255 sold by Hoechst.

The term "medium density polyethylene" (MDPE) as used herein is defined to mean an ethylene-containing polymer having a density of from about 0.926 to about 0.940. MDPE is readily available, e.g., Dowlex™ 2038 or Dowlex™ 2027A from The Dow Chemical Company, M4040 from Equistar, and Nova 74B and Nova 14G from Nova Corporation, Sarnia, Ontario, Canada.

As mentioned above, a cavitating agent is provided in the base layer. Such agents are typically added to the core or base layer prior to extrusion and are capable of generating voids (cavities) in the structure of the film during the film-making process. It is believed that small inhomogeneities introduced into the core layer by the cavitating agent result in points of weakness in the polyethylene sheet. The biaxial orienting step then induces tears in the core layer, causing cavitation in the processed film. The tears or cavities in the core layer vary in size and extend not only horizontally, i.e., within or parallel to the plane of the film, but also in the vertical dimension or perpendicular to the plane of the film. The pores in the base layer can be open like a sponge. In particular, the cavities can interconnect to provide open passageways or pores which extend through the entire thickness of the base layer. The porous, open-cell structure of the present base layer is discussed and illustrated in U.S. patent application Publication Ser. No. US 2001/0017431.

Any suitable cavitating agent can be used. One especially preferred cavitant is calcium carbonate ($CaCO_3$). Other inorganic cavitating agents can also be used. Organic cavitating agents are also known, but are generally less preferred due to their limited operating temperature range. However, such organic cavitants can be useful if they are extremely finely divided and are either resistant to melting at operating temperatures or produce a suitable inhomogeneity in the polyethylene sheet.

Cavitating agents can be included using methods known in the art, such as those described in U.S. Pat. Nos. 4,377,616 and 4,632,869. Examples of organic cavitating agents include polyacrylate particulates, polystyrene and polybutylene terephthalate (PBT). Crosslinked polymeric cavitating agents tend to be particularly melt resistant.

The percentage of cavitating agent included in the base layer depends upon the desired WVTR. In particular, if a higher WVTR is desired, then more cavitating agent should be included in the base layer. Generally, the base layer can include from about 1 wt % to about 30 wt % of a cavitating agent, for example, from about 3 wt % to about 15 wt %, e.g., from about 3 wt % to about 10 wt % of a cavitating agent, based on the entire weight of the base layer.

The normalized WVTR (WVTR of 1 mil thick of film) of each skin layer should be lower than the normalized WVTR of the overall multi-layer film, and substantially lower than the normalized WVTR of the cavitated polyethylene base layer. Materials for providing such a skin layer include MDPE or HDPE. Such MDPE or HDPE may have a density as great as that of the polyethylene in the base layer, but such MDPE or HDPE should not have a density greater than that of the polyethylene in the base layer. Each skin layer may have a thickness of from about 0.01 mil to about 0.25 mil, preferably from about 0.03 mil to about 0.15 mil.

Conventional casting apparatus may be used to prepare the present multi-layer film. For example, cast extrusion may be accomplished using a standard multi-roll stack system or a cast roll with an air cap (high velocity air applied to the outside of the sheet). Other casting systems, such as a cast roll and water bath system, may be used.

A polyethylene film prepared according to the present invention is biaxially oriented. Biaxial orientation is employed to evenly distribute the strength qualities of a film in the longitudinal or "machine direction" (MD) of the film and in the lateral or "transverse direction" (TD) of the film. Biaxial oriented films tend to be stiffer and stronger, and also exhibit much better resistance to flexing and folding forces, leading to greater utility in packaging applications.

Biaxial orientation can be conducted simultaneously in both directions. However, most biaxial orientation processes use apparatus which stretches the film sequentially, first in one direction and then in the other. A typical apparatus will stretch a film in the MD first and then in the TD. The degree to which a film can be stretched is dependent upon factors including, for example, the polymer from which a film is made. For further discussion concerning high biorientation of polyethylene films, see U.S. Pat. No. 5,885,721.

The present multi-layer film may be stretched to a relatively high degree. In particular, the film can be stretched in the MD to a degree of from about 5:1 to about 8:1 and in the TD to a degree of from about 6:1 to about 15:1. Nevertheless, as a general rule with a film of this invention, the higher the degree of stretch in both the MD and the TD, the higher the WVTR in the resulting film. The temperature at which a film is biaxially oriented ("stretch temperature") can also influence the WVTR in the resulting film. For example, the WVTR of a resulting film can be increased by biaxially orienting a film at a lower stretch temperature.

One exemplary embodiment of a multi-layer film has a base layer including HDPE and $CaCO_3$. The base layer is interposed between two skin layers, one of which includes MDPE and is free of resin.

Another exemplary embodiment of a multi-layer film has a base layer including MDPE and $CaCO_3$. The base layer is interposed between two skin layers and is coextensive with each of the skin layers. This film having MDPE in the base layer is preferable in some applications since it is less stiff and it creases less than films having a base layer including HDPE. In addition, this film having MDPE in the base layer has unidirectional tear properties in the machine direction.

Another exemplary embodiment provides for at least one tie layer interposed between a base layer and a skin layer wherein the tie layer is coextensive with each of the base layer and the skin layer. Additional tie layers can be provided to this structure to obtain a film having the desired WVTR. The tie layer of this embodiment may include MDPE or HDPE and the base layer includes HDPE and $CaCO_3$. Additionally, the tie layer can include pigment to provide color to the film and varying amounts of a cavitating agent to regulate the WVTR of the film. This tie layer may be interposed between the base layer and the skin layer which includes (i) a hydrocarbon resin and (ii) a copolymer of ethylene and at least one monomer having at least three carbon atoms.

Another exemplary embodiment is a five layer structure having a base layer, with first and second sides, interposed between two tie layers wherein one tie layer is interposed between the first side of the base layer and a first skin layer and the other tie layer is interposed between the second side of the base layer and a second skin layer. The tie layers of this structure are coextensive with the base layer and each of the skin layers is coextensive with its adjacent tie layer.

The base layer of this five layer structure may include HDPE and $CaCO_3$ and the tie layers may include MDPE or HDPE. Process conditions, though, can warrant using at least one tie layer including HDPE and $CaCO_3$ if further cavitation is desired. In addition, the two tie layers can be of the same or different materials. A resin-free skin layer of this structure may include MDPE. The result of biaxially orienting a sheet having this five layer structure is a rigid and opaque film having a gloss of about 25% and paperlike characteristics.

Another exemplary embodiment also has a five layer structure having a base layer interposed between two tie layers wherein one tie layer is interposed between the first side of the base layer and a first skin layer and the other tie layer is interposed between the second side of the base layer and a second skin layer. The base layer of this multi-layer structure may include HDPE and $CaCO_3$. The tie layers of this structure may include either a MDPE or a blend of HDPE and LDPE to assure good skin adhesion and can be of the same or different materials. The skin layers of this structure may both include an ethylene-propylene copolymer or an ethylene-propylene-butylene terpolymer. The skin layers can include the same or different polyolefin polymers.

The result of biaxially orienting a sheet having this five layer structure where the polyolefin polymers of the skin layers are ethylene-propylene copolymers or ethylene-propylene-butylene terpolymers, is a film having a high gloss typically greater than 50% (ASTM D 2457). In addition, the resulting five layer film is paperlike, opaque and rigid.

The multi-layer films of the present invention can be surface treated with conventional methods to improve wettability of the film and ink receptivity. Films can further be coated by known methods to modify barrier characteristics, provide heat seal properties and modify surface characteristics. Additives, such as pigments, antiblocking agents, antistatic agents and slip agents may be blended in the base layer, skin layers and/or tie layers. The films can be modified by metallization to obtain a metal-like appearance and altered barrier characteristics.

The films of the present invention are useful in numerous applications including food packaging and in particular, in food packaging where high WVTR is desirable such as the packaging of cheese products. Additionally, these films are advantageous for use in cigarette pack inner liners, as overwrap for butter, chocolate, candy, etc., and as twistwrap.

The films of the present invention may have the desirable unidirectional tear properties in the machine direction possessed by the cavitated films described in U.S. Pat. No. 6,228,505 to Agent, et al. In particular, tears initiated in these films tend to propagate exclusively in the machine direction and not in the transverse direction. Such films are especially useful in food packaging.

The films of the present invention can eliminate the use of a tear tape in food packages. For example, when a notch or small tear is generated in the machine direction, an elongated tear can be initiated and then continued in a straight line through the whole structure of the film in a controlled way down the machine direction without the use of a tear tape. This property may permit easy opening of a package by generating a straight tear parallel to a seal seam in an area just below the seal seam.

In particular, one can hold the package with the seal seam in a horizontal position and generate a straight tear along the machine direction, which does not propagate in the vertical and transverse direction. Such unidirectional tear properties prevent the unintended and undesired vertical tearing of the package, in a manner which would permit the package contents, such as candy pieces, to spill out of the vertically torn sides of the package.

As mentioned above, a coextruded biaxially oriented film structure may have three or four layers.

| A particular 3-layer design may be: | |
|---|---|
| A-layer: | Medium Density PE, 10–12 gauge |
| B-layer: | Cavitated HDPE (with 5–10 wt % $CaCO_3$) |
| C-layer: | Terpolymer or copolymer + 10–20 wt % cyclopentadiene hydrocarbon, 3–5 gauge. |

| A particular 4-layer design may be: | |
|---|---|
| A-layer: | Medium Density PE, 5–6 gauge |
| B-layer: | Cavitated HDPE (with 5–10 wt % $CaCO_3$) |
| D-layer: | Medium Density PE, 5–6 gauge |
| C-layer: | Terpolymer or copolymer + 10–20 wt % cyclopentadiene hydrocarbon, 3–5 gauge. |

The C-layer is the cast roll side skin layer. The addition of the hydrocarbon in the terpolymer skin layer results in improving the adhesion of the C-layer skin to the cavitated HDPE core. LDPE or MDPE resin may, optionally, be added at 10–20 wt % in the terpolymer resin. It is desired to avoid buildup of low molecular weight material on the die lip. A particular hydrocarbon resin, Exxon 6114E1, is designed not to buildup on the die lip.

It is surprising that adding the hydrocarbon to the terpolymer skin resulted in a more permeable skin layer, resulting in a WVTR of approximately 4 gms./100 sq.in./day or greater.

The 4-layer design listed above may be a better design at higher line speeds. Adhesion of the outer skin will likely be more robust if the tie layer is MDPE. Such MDPE will adhere well to the core layer. The MDPE tie layer will also tend to adhere better to the outer skin layer because these layers are more compatible.

A series of experiments were performed to illustrate features and advantages of the present invention. Manufacturing conditions included a cast at a temperature between about 100° F. (38° C.) to 140° F. (60° C.). Orientation was performed using conventional orienting equipment. Further, each film was stretched in the machine direction at a temperature of from about 230° F. (110° C.) to 250° F. (121° C.) and in the transverse direction at about 250° F. (121° C.) to 270° F. (132° C.).

EXAMPLE 1

A 135 poly gauge coextruded 3-layer biaxially oriented film structure having a HDPE cavitated core was produced with a terpolymer skin layer with and without blends of LDPE and hydrocarbon (Exxon 6114E1). Measured properties were WVTR and skin adhesion (using a Mobil designed adhesion peel test). The table below summarizes the results. All percentages are by weight.

| C-layer Skin Resin (4 gauge) | WVTR (gms./100 sq. in./day) | Skin Adhesion (gms./in.) |
|---|---|---|
| 100% terpolymer (Chisso 7510) | 1.2 | <30 |
| 90% terpolymer + 10% Exxon 6114 | 3.5 | 200 |
| 80% terpolymer + 20% Exxon 6114 | 4.2 | 320 |
| 90% terpolymer + 10% LDPE | 1.7 | 210 |
| 80% terpolymer + 20% LDPE | 2.6 | 300 |
| 80% terpolymer + 20% MDPE | 2.3 | 230 |
| 100% MDPE | 4.0 | 300 |

The cavitating agent was CaCO$_3$ and the density of the film was 0.54–0.58. The A-layer skin was MDPE during this experiment. All the film samples were produced at 150 feet per minute (fpm). Chisso 7510 is an ethylene-propylene-butene-1 terpolymer and may be obtained from Chisso Corp. of Japan.

The film design for Example 1 is summarized below:

| The film design for Example 1 is summarized below: | |
|---|---|
| A-layer: | Medium Density PE, 11 gauge |
| B-layer: | Cavitated HDPE (with 7 wt % CaCO$_3$) |
| C-layer: | Terpolymer + LDPE or hydrocarbon resin (HCR), 4 gauge. |

EXAMPLE 2

A 135 poly gauge coextruded 4-layer biaxially oriented film structure having a HDPE cavitated core was produced with a terpolymer skin layer with blends of LDPE and hydrocarbon (Exxon 6114E1), and a MDPE tie layer. Measured properties were WVTR and skin adhesion (using a Mobil designed adhesion peel test). The table below summarizes the results. All percentages are by weight.

| C-layer Skin Resin (4 gauge) | WVTR (gms./100 sq. in./day) | Skin Adhesion (gms./in.) |
|---|---|---|
| 100% terpolymer | 1.4 | 130 |
| 80% terpolymer + 20% Exxon 6114 | 3.8 | 360 |
| 80% terpolymer + 20% LDPE | 2.8 | 320 |
| 80% terpolymer + 20% MDPE | 2.4 | 270 |

The cavitating agent was CaCO$_3$ and the density of the film was 0.54–0.58. The A-layer skin was MDPE during this experiment. The tie layer was MDPE. All the film samples were produced at 150 fpm.

The 4-layer film design for Example 2 summarized below:

| The 4-layer film design for Example 2 summarized below: | |
|---|---|
| A-layer: | Medium Density PE, 5 gauge |
| B-layer: | Cavitated HDPE (with 7 wt % CaCO$_3$) |
| D-layer: | Medium Density PE, 6 gauge |
| C-layer: | Terpolymer + LDPE or HCR, 4 gauge. |

What is claimed is:

1. A multi-layer, bioriented film stretched in the machine direction and in the transverse direction, said film comprising
   (a) a base layer comprising polyethylene and a cavitating agent, said base layer having a first and second side;
   (b) skin layers on said first and second sides of said base layer, wherein at least one of said skin layers comprises (i) a hydrocarbon resin and (ii) a copolymer of ethylene and at least one monomer having at least three carbon atoms; and
   wherein the multi-layer film has a WVTR of at least 3.0 grams/100 square inches/day at 38° C. and 100% relative humidity.

2. A film according to claim 1, wherein said copolymer (ii) is an ethylene-propylene copolymer or an ethylene-propylene-butylene terpolymer.

3. A film according to claim 1, wherein said hydrocarbon resin is selected from the group consisting of a petroleum resin, a terpene resin, a styrene resin and a cyclopentadiene resin.

4. A film according to claim 1, wherein at least one of said skin layers comprises from about 10 to about 20 wt % of said hydrocarbon resin (i) and about 80 to about 90 wt % of said copolymer (ii).

5. A film according to claim 1, comprising at least one tie layer comprising polyethylene.

6. A film according to claim 1, wherein said polyethylene in said base layer (a) is high density polyethylene or medium density polyethylene.

7. A film according to claim 6, wherein said cavitating agent is calcium carbonate and said base layer comprises from about 3 wt % to about 15 wt % of said calcium carbonate.

8. A film according to claim 7, wherein said base layer has a porosity of at least 20%, and wherein said film has unidirectional tear properties in the machine direction.

9. A method for making the film according to claim 1, said method comprising the steps of:
   (i) coextruding layers having the composition of said layers (a) and (b);
   (ii) casting said coextruded layers of step (i) over a casting toll;
   (iii) stretching said cast film of step (ii) in the machine direction; and
   (iv) further stretching said stretched film of step (iii) in the transverse direction,
   wherein at least one of said skin layers comprised of (i) a hydrocarbon resin and (ii) a copolymer of ethylene and at least one monomer having at least three carbon atoms is on the casting roll side of the film.

10. The method of claim 9 wherein a tie layer is interposed between and coextensive with layers (a) and (b).

11. The method of claim 10 wherein said tie layer includes a cavitating agent.

12. A multi-layer, bioriented film stretched in the machine direction and in the transverse direction, said film comprising
   (a) a base layer consisting essentially of a polyethylene and 1 wt % to 30 wt. % of a cavitating agent, said base layer having a first and second side;
   (b) skin layers on said first and second sides of said base layer, wherein at least one of said skin layers comprises (i) 5 wt. % to 30 wt. % of a hydrocarbon resin and (ii) a copolymer of ethylene and at least one monomer having at least three carbon atoms; and
   wherein the multi-layer film has a WVTR of at least 3.0 grams/100 square inches/day at 38° C. and 100% relative humidity.

13. A film according to claim 12, wherein said copolymer (ii) is an ethylene-propylene copolymer or an ethylene-propylene-butylene terpolymer.

14. A film according to claim 12, wherein said hydrocarbon resin is selected from the group consisting of a petroleum resin, a terpene resin, a styrene resin and a cyclopentadiene resin.

15. A film according to claim 12, wherein at least one of said skin layers comprises from about 10 to about 20 wt % of said hydrocarbon resin (i) and about 80 to about 90 wt % of said copolymer (ii).

16. A film according to claim 12, comprising at least one tie layer comprising polyethylene and a cavitating agent.

17. A film according to claim 12, wherein said polyethylene in said base layer (a) is high density polyethylene or medium density polyethylene.

18. A film according to claim 17, wherein said cavitating agent is calcium carbonate and said base layer comprises from about 3 wt % to about 15 wt % of said calcium carbonate.

19. A film according to claim 18, wherein said base layer has a porosity of at least 20%, and wherein said film has unidirectional tear properties in the machine direction.

20. A method for making the film according to claim 12, said method comprising the steps of:

(i) coextruding layers having the composition of said layers (a) and (b);

(ii) casting said coextruded layers of step (i) over a casting roll;

(iii) stretching said cast film of step (ii) in the machine direction; and (iv) further stretching said stretched film of step (iii) in the transverse direction, wherein at least one of said skin layers comprised of (i) a hydrocarbon resin and (ii) a copolymer of ethylene and at least one monomer having at least three carbon atoms is on the casting roll side of the film.

* * * * *